United States Patent [19]

Dislich et al.

[11] Patent Number: 4,715,999

[45] Date of Patent: Dec. 29, 1987

[54] PROCESS OF MAKING OPTICAL BLANKS

[75] Inventors: Helmut Dislich, Budenheim; Nanning J. Arfsten, Bischofsheim; Helmut Schmidt, Hoechberg; Gottfried Philipp, Kist; Gerhard Tuenker, Wuerzburg, all of Fed. Rep. of Germany

[73] Assignee: Schott Glaswerke, Munich, Fed. Rep. of Germany

[21] Appl. No.: 796,460

[22] Filed: Nov. 8, 1985

[30] Foreign Application Priority Data

Nov. 7, 1984 [DE] Fed. Rep. of Germany ....... 3440652

[51] Int. Cl.$^4$ ............................................. B29D 11/00
[52] U.S. Cl. .................................. 264/1.1; 264/331.11; 264/331.21; 523/107; 526/279; 528/14; 528/17; 528/26; 528/42; 528/43
[58] Field of Search ..................... 264/1.1, 2.2, 2.7, 22, 264/25, 126, 320, 328.2, 328.6, 331.11, 331.21; 526/279; 528/14, 17, 26, 28, 32, 34, 38, 41, 42, 43; 523/107

[56] References Cited

U.S. PATENT DOCUMENTS

| Re. 31,406 | 11/1983 | Gaylord et al. ............... | 264/1.1 X |
| 4,152,508 | 5/1979 | Ellis et al. ..................... | 264/1.1 X |
| 4,153,641 | 5/1979 | Deichart et al. ............... | 526/279 X |
| 4,182,822 | 1/1980 | Chang .......................... | 526/279 X |
| 4,259,467 | 3/1981 | Keogh et al. ................... | 526/279 |
| 4,343,927 | 8/1982 | Chang .......................... | 264/1.1 X |
| 4,419,505 | 12/1983 | Ratkowski et al. ............. | 264/1.1 X |
| 4,424,328 | 1/1984 | Ellis ............................. | 526/279 |
| 4,463,149 | 7/1984 | Ellis ............................. | 526/279 |

FOREIGN PATENT DOCUMENTS

| 0078548 | 11/1982 | European Pat. Off. . | |
| 94153 | 11/1983 | European Pat. Off. ............. | 264/1.1 |
| 127321 | 12/1984 | European Pat. Off. ............. | 264/1.1 |
| 1769996 | 2/1971 | Fed. Rep. of Germany . | |
| 3143820 | 5/1983 | Fed. Rep. of Germany ....... | 264/1.1 |
| 2039932 | 8/1980 | United Kingdom ................ | 264/1.1 |
| 1033349 | 8/1983 | U.S.S.R. ............................ | 264/1.1 |

Primary Examiner—Jeffery Thurlow
Assistant Examiner—Leo B. Tentoni
Attorney, Agent, or Firm—Millen & White

[57] ABSTRACT

Optical blanks, for example spectacle lenses, are produced by hot-blank pressing or injection molding of polyorganoheterosiloxanes which are obtainable by hydrolytic polycondensation of at least one titanium-, zirconium-or tin-compound, at least one organofunctional silane and, where applicable, at least one inorganic oxide component. For control of the optical characteristics and working properties, polyorganoheterosiloxanes which have a polymerizable organic radical may be modified by additional polymerization with other copolymerizable condensates or monomers.

14 Claims, No Drawings

PROCESS OF MAKING OPTICAL BLANKS

BACKGROUND OF THE INVENTION

The invention relates to optical blanks made from polyorganoheterosiloxanes and a method of making the same.

Glass is a material which by virtue of the diversity in its chemical composition allows the achievement of specifically desired optical data the most important of which are the refractive index $n_D$ and the Abbe number $v_D$. However, there is the drawback that glass must be melted down at very high temperatures requiring much energy and that the optical blank, for example a lens, must be produced by expensive grinding and polishing treatment. Moreover, glasses frequently have high densities and are not fracture resistant without special provisions. These drawbacks are very apparent in spectacle lenses so that glass is being increasingly replaced by plastics materials.

In respect of optical data, plastics have more limitations than glasses. However, they are produced at lower temperatures and have greater fracture resistance. Furthermore, the density of plastics is only about half that of glasses. Moulded blanks made from plastic materials, for example optical lenses, are obtained by application of very time-consuming casting processes using expensive, long time-blocked glass molds or of the more rational injection molding process. However, plastics (thermoplastics) which are produced by application of the latter process scratch very easily and those made by application of the first mentioned process, such as for example CR39 which is predominantly used for spectacle lenses, are somewhat less vulnerable to scratching but still considerably more so than glass.

From EP-A-78 548 hydrophilic polyorganoheterosiloxanes are known which are worked into contact lenses by casting, hardening in the mold and subsequent cutting and other mechanical treatment. However, this method is labor and time consuming.

SUMMARY OF THE INVENTION

It is therefore an object of the present invention to create a method of making optical blanks which can be applied quickly, easily and cost effectively and provides a directly achieved end product requiring no after-treatment by grinding or polishing. The optical blanks shall be capable of being processed at low temperatures and the optical data such as refractive index $n_D$ and Abbe number $v_D$ shall be adjustable in the desired manner by virtue of the material composition.

Another object of this invention is a method of making optical blanks on the basis of polyorganoheterosiloxanes which is characterised in that plastic or thermoplastic polyorganoheterosiloxanes, which are obtainable by hydrolytic preliminary condensation of (a) at least one compound of the formula I which is soluble in the reactive medium $$MR_4 \quad (I)$$

wherein M represents titanium, zirconium or tin and R represents halogen, carbonate, hydroxy, alkoxy, acyloxy, or a chelate ligand;

(b) at least one organofunctional silane of the formula II $$R_m'(R''Y)_n SiX_{(4-m-n)} \quad (II)$$

wherein R' represents alkyl, alkenyl, aryl, arylalkyl, alkylaryl, arylalkenyl or alkenylaryl, R" represents alkylene, arylene, alkylenearylene, alkenylene or alkenylenearylene; and wherein these radicals may be substituted by oxygen or sulphur atoms or by —NH- groups, X represents hydrogen, halogen, hydroxy, alkoxy, acyloxy or the group —NR$_2'''$ (R'''=hydrogen and/or alkyl), Y represents halogen or a substituted or unsubstituted amino-, amide-, aldehyde-, alkylcarbonyl-, carboxy-, mercapto-, cyano-, alkoxy-, alkoxycarbonyl-, sulphonic acid-, phosphoric acid-, acryloxy-, methacryloxy-, epoxy- aryl- or vinyl- group, m and n have the value 0, 1, 2, or 3 and m+n having the value 1, 2, or 3; and optionally (c) at least one oxide, soluble in the reactive medium and having low volatility, of an element of the main groups Ia to Va or of the secondary groups IIb or to Vb in the periodic system, with the exception of titanium, zirconium and tin, or at least one compound of one of these elements soluble in the reaction medium and under the reaction conditions forming an oxide which has low volatility;

without addition of water or with the addition of a quantity of water less than stoichiometric quantity required for the complete hydrolysis of the existing hydrolyzable groups, optionally in the presence of a condensation-catalyst, and subsequent further condensation by addition of at least the quantity of water which is needed for the hydrolysis of the remaining hydrolyzable groups, and optionally a condensation catalyst, in which process, related to the total molar number of the initial components, 20 to 80 molar per cent of component (a), 80 to 20 molar percent of component (b) and 0 to 50 molar percent of component (c) have been used, are formed by hot-blank pressing or by injection moulding to form an optical lens blank or like body.

Upon further study of the specification and appended claims, further objects and advantages of this invention will become apparent to those skilled in the art.

Preferably the polyorganoheterosiloxanes are produced using from 40 to 70 molar per cent of component (a), from 60 to 30 molar per cent of component (b) and from 0 to 30 molar per cent of component (c).

In the foregoing formulae (I) and (II), radicals R, R', R", R''', X or Y occuring several times in a compound may in each case have the same or different meaning.

The alkyl radicals signify, for example, straight chain, branched or cyclic radicals with from 1 to 10 carbon atoms and in particular lower alkyl radicals with 1 to 6, preferably 1 to 4, carbon atoms. Specific exmples are methyl, ethyl, n-propyl, isopropyl, n-butyl, sec-butyl, tert-butyl, isobutyl, n-pentyl, n-hexyl and cyclohexyl.

The alkenyl radicals are, for example, straight or branched chain or cyclic radicals with 2 to 10 carbon atoms and particularly lower alkenyl radicals, such as vinyl, allyl and 2-butenyl.

The aryl radicals contain, for example, 6 to 25, preferably 6 to 14, and in particular 6 to 10, carbon atoms. Specific examples are phenyl and naphthyl with phenyl being preferred.

The alkoxy-, acyloxy-, alkylamino-, dialkylamino-, alkylamido-, dialkylamido-, arylalkyl-, alkylaryl-, arylalkenyl-, alkenylaryl-, alkylene-, alkenylene-, alkylenearylene-, alkenylenearylene-, alkylcarbonyl- and alkoxycarbonyl radicals can be derived for example from the aforementioned alkyl-, alkenyl-, and aryl-radicals. Special examples are methoxy, ethoxy, n- and i-propoxy-, n-, sec.-and tert.-butoxy, isobutoxy, β-methoxyethoxy acetyloxy, propionyloxy, monomethylamino, monoethylamino, di-methylamino, diethylamino, monomethylanilino, methylene, ethylene propylene, butylene, benzyl, tolyl, toluylene, styryl, methylcarbonyl, ethylcarbonyl, methoxycarbonyl and ethoxycarbonyl.

The above mentioned radicals may optionally carry commonly used substituents, for example halogen atoms, lower alkyl radicals hydroxy-, nitro- or amino-groups.

Among the halogens, fluorine, chlorine and bromine are preferred, giving special preference to chlorine.

The following are specific examples for titanium-, zirconium- and tin compounds (a): TiCl$_4$, ZrCl$_4$, SnCl$_4$,Ti(OC$_2$H$_5$)$_4$, Ti(OC$_3$H$_7$)$_4$, Ti(O-i-C$_3$H$_7$)$_4$, Ti(OC$_4$H$_9$)$_4$, Ti(2-ethyl-hexoxy)$_4$, Zr(O-i-C$_3$H$_7$)$_4$, Zr(OC$_3$H$_7$)$_4$, Zr(OC$_4$H$_9$)$_4$, Sn(OC$_2$H$_5$)$_4$, Ti(acetylacetonato)$_2$(O-i-C$_3$H$_7$)$_2$, and other titanium-or zirconium complexes with chelate ligands which are preferably coordinated via oxygen and/or nitrogen.

In the case of the organofunctional silanes (b), the bridging group R″ may optionally be interrupted by oxygen- or sulphur atoms or —NH-groups. Preferably from 2 to 10 repeating structural units are formed in this manner.

The following are specific examples of organofunctional silanes (b):

CH$_3$—Si—Cl$_3$, CH$_3$—Si—(OC$_2$H$_5$)$_3$, C$_2$H$_5$—Si—Cl$_3$,
    C$_2$H$_5$—Si—(OC$_2$H$_5$)$_3$, CH$_2$=CH—Si—(OC$_2$H$_5$)$_3$,
CH$_2$=CH—Si—(OC$_2$H$_4$OCH$_3$)$_3$, CH$_2$=CH—Si—(OOCCH$_3$)$_3$,
(CH$_3$)$_2$—Si—Cl$_2$, (CH$_3$)$_2$—Si—(OC$_2$H$_5$)$_2$, (C$_2$H$_5$)$_2$—Si—(OC$_2$H$_5$)$_2$,
(CH$_3$)(CH$_2$=CH)—Si—Cl$_2$, (CH$_3$)$_3$—Si—Cl, (C$_2$H$_5$)$_3$—Si—Cl,
(t-C$_4$H$_9$)(CH$_3$)$_2$—Si—Cl, (CH$_3$)$_2$(CH$_2$=CH—CH$_2$)—Si—Cl,
(CH$_3$O)$_3$—Si—C$_3$H$_6$—Cl, (C$_2$H$_5$O)$_3$—Si—C$_3$H$_6$—NH$_2$,
(C$_2$H$_5$O)$_3$—Si—C$_3$H$_6$—CN, (CH$_3$O)$_3$—Si—C$_3$H$_6$—SH,
    (CH$_3$O)$_3$—Si—C$_3$H$_6$—NH—C$_2$H$_4$—NH$_2$,
(CH$_3$O)$_3$—Si—C$_3$H$_6$—NH—C$_2$H$_4$—NH—C$_2$H$_4$—NH$_2$,

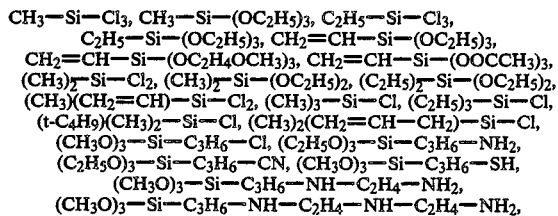

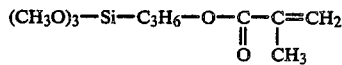

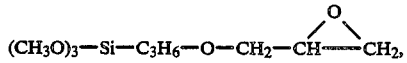

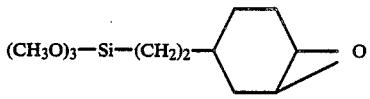

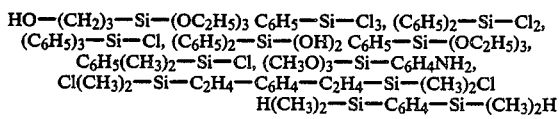

HO—(CH$_2$)$_3$—Si—(OC$_2$H$_5$)$_3$ C$_6$H$_5$—Si—Cl$_3$, (C$_6$H$_5$)$_2$—Si—Cl$_2$, (C$_6$H$_5$)$_3$—Si—Cl, (C$_6$H$_5$)$_2$—Si—(OH)$_2$ C$_6$H$_5$—Si—(OC$_2$H$_5$)$_3$, C$_6$H$_5$(CH$_3$)$_2$—Si—Cl, (CH$_3$O)$_3$—Si—C$_6$H$_4$NH$_2$, Cl(CH$_3$)$_2$—Si—C$_2$H$_4$—C$_6$H$_4$—C$_2$H$_4$—Si—(CH$_3$)$_2$Cl
                  H(CH$_3$)$_2$—Si—C$_6$H$_4$—Si—(CH$_3$)$_2$H

These silanes are either commercially available products or can be produced by known methods, see for example W. Noll, "Chemie und Technologie der Silicone", Verlag Chemie, GmbH, Weinheim/Bergstrasse (1968).

Instead of using the monomeric initial silanes (b), it is possible, where applicable, also to use precondensed oligomers of these silanes which are soluble in the reaction medium, that is to say, straight chain or cyclic low-molecular partial condensates having a degree of condensation from, for example, about 2 to 100.

As component (c), oxides with very low volatility and which are soluble in the reaction medium, or compounds of elements from main groups Ia to Va or from the secondary groups IIb to Vb of the periodic system are used which form such low-volatility oxides. Preferentially, component (c) is derived from the following elements: Na,K,Mg,Ca,Ba,Sr,B,Al, Si,Pb,P,As,Sb,Zn,La and/or Hf.

Among the low-volatility oxides which are soluble in the reaction medium, the following are particularly preferred: Na$_2$O, K$_2$O, CaO, La$_2$O$_3$, B$_2$O$_3$, P$_2$O$_5$ and Al$_2$O$_3$.

Compounds forming oxides which have low volatility and are soluble in the reaction medium are, for example, inorganic acids such as phosphoric acid and boric acid, as well as their esters. Also suitable are, for example, halides such as AlCl$_3$, SiCl$_4$, HSi Cl$_3$, SnCl$_4$ and PCl$_5$ and alkoxides such as NaOR, KOR, Ca(OR)$_2$, Al(OR)$_3$, La(OC$_2$H$_5$)$_3$, Si(OR)$_4$ and Ta(OR)$_5$, with R being derived from low alcohols such as methanol, ethanol, propanol or butanol. Further usable components are derivatives with volatile acids, for example acetates, such as silicon tetraacetate, basic acetates such as basic lead acetate, and formates.

For the production of the polyorganoheterosiloxanes the initial components, at the desired mix ratio without the addition of water or with the addition of water in a quantity less than that which is stoichiometrically required for the complete hydrolysis of the existing hydrolyzable groups, are subjected to a preliminary condensation process.

This preliminary condensation may be effected, where applicable in the presence of an organic solvent, preferably in the presence of a condensation catalyst. The following are examples of suitable solvents: aliphatic alcohols such as ethanol, propanol, isopropanol or butanol; ethers such as dimethoxyethane; esters such as ethyleneglycol acetate; ketones such as acetone or methylethylketone; aromatic hydrocarbons such as benzene or toluene, and mixtures thereof.

Suitable for use as condensation catalysts are organic and inorganic acids and bases. Specific examples are acids such as hydrochloric acid, sulphuric acid, phosphoric acid, formic acid or acetic acid, as well as bases such as ammonia, alkali or alkaline earth metal hydroxides, for example sodium-, potassium- or calcium hydroxide, and amines which are soluble in the reaction medium, for example lower alkylamines or alkanol amines. Here special preference will be accorded to volatile acids and bases, in particular hydrochloric acid, ammonia and triethylamine. Total catalyst concentration may amount, for example, to 3 mol/liter.

Preliminary condensation is normally applied at temperatures between room temperature and 100° C. When an organic solvent is used, it may also be carried out at temperatures up to the boiling point of the solvent in question.

When this is desirable in a given case, preliminary condensation may be initially applied to one or more of the starting components or to a fraction of one, more or all starting components, whereafter the remaining starting components are added and mixed in and subsequently condensed by preliminary or further condensation methods.

The subsequent hydrolytic further condensation of the preliminary condensate is applied in the presence of a quantity of water is at least equal to the quantity of water stoichiometrically required for the hydrolysis of the remaining hydrolyzable groups, but is preferably in excess of this quantity. In one embodiment of the invention which is preferred for practical reasons, the quantity of water which is used for further condensation is equal to the amount of water which would be stoichiometrically needed for the complete hydrolysis of the initial components originally used.

The further condensation stage occurs usually at temperatures between room temperature and 100° C., preferably in the presence of one of the aforementioned condensation catalysts. Here again preference will be given to volatile compounds. Total catalyst concentration may be, for example, 5 mol/l.

Potentially one of the aforementioned organic solvents may also be present, or added, in the further condensation process, any solvent formed during preliminary and further condensation stages or potentially added for preliminary or further condensation being completely removed when further condensation is terminated. This may be done, for example by drying the solid or resin-type product at normal pressure or in vacuum at temperature of up to about 100° C. The polyorganoheterosiloxanes thus obtained are then made into optical blanks by hot-blank pressing or by injection molding at temperatures from 10° to 200° C., preferably from 80° to 150° C., and pressures from 1 to 100 kN/cm$^2$, preferably 10 to 50 kN/cm$^2$. The hot-pressability of the polyorganoheterosiloxanes according to this invention has a great advantage over the hot pressing of classical glasses because according to this invention one can operate at far lower temperatures. This also makes the production of aspherical blanks economical.

The technique of injection molding to produce the optical blanks according to the present invention is generally conventional with the exception that one can work at lower temperatures. With respect to the hot-blank pressing, the following procedure is employed:

In contrast to the known process for producing a granulate of the organic polymers, in the present invention there is no special step required to produce a granulate. As shown in the examples, a granulate or powder is produced when the condensation reaction has come to an end and the solvent is removed. The granulated product thus obtained is then treated at temperature of 10° to 200° C., preferably 80° to 150° C. and formed under pressure 1-100 kN/cm$^2$, preferably 10-50 kN/cm$^2$ into the optical blanks by an otherwise conventional hot-blank pressing technique.

Contact lenses on the other hand are produced quite differently. When the hydrolytic condensation of the components is completed the solvent is removed only to such an extent that the product remains liquid and can be poured into a mold. Thereafter, the product is dried at temperatures up to 150° C. and further condensed. This hardening step takes up to 48 hours.

The dimensions of the optical blanks produced by this invention are generally 50-70 mm of a diameter with a central thickness of 1-14 mm whereas the contact lenses of the prior art are much smaller having discs having a diameter of 14-16 mm and a thickness of 1-2 mm. Differences in properties aside from the dimensions are:
1. Optical blank: $n_d$, $v_d$ can be varied to a large extent and the material is more resistant to scratching.
2. Contact lenses: the material is hydrophilic and oxygen permeable.

The optical properties of the blanks produced in accordance with this invention can be easily predetermined, for example by a suitable choice of the initial components. For example, the refractive index $n_D$ increases with an increasing proportion of component (a), the Abbe number $v_D$ with an increasing proportion of alkylsubstituted silanes.

Optical blanks produced in accordance with the invention may have, for example, as compared with the conventional spectacle lens glass material CR39 ($n_D=1.499$), a higher refractive index, for example $n_D=1.60$, with an Abbe number $\geq 30$. This enables the production of thinner and lighter lenses with additionally lower dispersion. The Zr-component (a) in this case causes the achievement of higher Abbe numbers than, for example, the Ti-component and will be given preference for this reason.

The densities of the optical blanks according to this invention at 1.3 to 1.9 g/cm$^3$ are very low which affords a further saving in weight. Resistance to wiping, mechanical strength and chemical resistance satisfy the demands normally applied, for example to spectacle lenses.

Besides controlling the optical characteristics, it is also possible to control the working properties of the polyorganoheterosiloxanes by a suitable choice of the initial components of their proportions. For example, the desired thermoplastic properties may be achieved by a correspondingly high proportion of aryl substituted silanes. On the other hand, plastic deformability behavior is achieved by limiting the condensation of the initial components to a stage at which a product which is still plastically deformable (elastically deformable) is obtained.

Regarding control of the mechanical, and potentially of the optical characteristics and processing properties of the polyorganoheterosiloxanes, an optional advantage is to crosslink these polyorganoheterosiloxanes in a further polymerization reaction. To this end, one of the polyorganoheterosiloxanes which has been obtained by application of the above described method and has at least one polymerizable organic radical is polymerized with (i) a condensate which has at least one copolymerizable radical, e.g. with itself, or
(ii) a copolymerizable organic monomer, oligomer or polymer, potentially in the presence of a polymerization catalyst. The expression "polymerization" in this context generally embraces polymerization-, polyaddition-and polycondensation-reactions.

The following are examples of copolymerizable organic monomers (ii):(meth)-acrylic acid and its salts, preferably the alkali metal salts such as the sodium salt; (meth) acrylic acid esters, such as methyl(meth)acrylate, ethyl(meth)acrylate, butyl(meth)acrylate, cyclohexyl(meth)acrylate, glycidyl(meth)acrylate, ethyleneglycolmono(meth)acrylate, diethyleneglycolmono(meth)acrylate, triethyleneglycolmono(meth) acrylate, allyl(meth)acrylate, 2-hydroxypropyl (meth)acrylate, 3-hydroxypropyl (meth)acrylate, 2-ethoxyethyl(meth) acrylate, 2-dimethylaminoethyl(meth)acrylate and 3-methoxy-2-hydroxypropyl(meth)acrylate; (meth)acrylic acid amides such as (meth)acrylamide, N-methylol(meth)acrylamide and dimethyl(meth)acrylamide; allyl compounds such as allylalcohol and allylglycidylether; vinyl compounds such as N-vinylpyrrolidone and styrene; epoxides and isocyanates.

In the foregoing and also in the claims the expression "(meth)acryl" is understood to cover acrylic acid compounds as well as methacrylic acid compounds.

The quantity of the copolymerizable organic monomer (ii) is preferably selected such that the copolymerizate obtained contains at least 40 mol percent, in particular at least 60 mol per cent, related to the total mol number, of the polyorganoheterosiloxanes used.

Where applicable the polymerization or copolymerization process may be carried out in the presence of one or more polyunsaturated compounds acting as crosslinking agents. The following are specific examples of suitable crosslinking agents: ethyleneglycoldi(meth)acrylate, diethyleneglycoldi(meth)acrylate, triethyleneglycoldi(meth)acrylate, butyleneglycoldi (meth)acrylate, neopentylglycoldi(meth)acrylate, pentaerythritotri(meth)acrylate, pentaerythritotetra(meth)acrylate, allyl(meth)acrylate, trimethylolpropanetri(meth)acrylate, divinylbenzene, diallylphthalate and bisphenol-A-derivatives.

The quantity of the crosslinking agent is preferably from 0.1 to 20 mol per cent.,in particular 1 to 10 mol percent, related to the total mol number of the monomer, oligomer or polymer.

For polymerization or copolymerization, the initial components and the polymerization catalyst are homogeneously mixed and polymerized prior to or during the blank pressing or injection molding process.

The following are examples of suitable polymerization catalysts: free radical-formers which are thermally or photo-chemically activated, for example organic peroxides such as dicyclohexylperoxidedicarbonate, perketals such as benzildimethylketal, peresters such as perbenzoic acid-tert-butylester and azo compounds such as azobis-iso-butyronitril. Other polymerization catalysts are acids such as $HClO_4$, Lewis-acids such as $AlCl_3$, and bases, for example metalhydroxides or organic amines.

The polymerization or copolymerization may be thermally initiated by actinic radiation such as with $\alpha$-,$\beta$- or $\gamma$-rays or with ultraviolet light. It is carried out at temperatures from room temperature up to 200° C., preferably from room temperature up to 150° C., at normal, increased or reduced pressure, for example a pressure of 0.01 to 20 bar, in air or in an inert atmosphere. However, the polymerization reaction may also occur during blank pressing or injection molding.

Compared with the polyorganoheterosiloxanes for hydrophilic contact lenses having high oxygen permeability which are described in EP-A-78 548, the polyorganoheterosiloxanes used in accordance with the invention are not confined to hydrophilic and oxygen-permeable materials.

In the formula

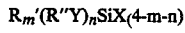

Y represents the moiety which may introduce hydrophilic properties into the polyorganoheterosiloxanes.

For the contact lenses, uniform hydrophilic properties of the product are required since the endproduct is cut into discs, and the surface must exhibit uniform properties. Due to their hydrophilic properties, the contact lenses swell, a phenomenon which has to be taken into account when estimating the $n_d$ of such a lense. For an optical blank, these phenomena are undesired. Consequently, the optical blanks of this invention are essentially non-swelling materials, but nevertheless a minor amount of hydrophilic groups may be present in the optical blank.

Preferred definitions of Y in the present invention are: aryl, hydroxy methacryloxy-, epoxy- or vinyl-groups.

It was also a complete surprise to find that the polyorganoheterosiloxanes according to the invention, despite their very high contents in component (a), are still capable of softening and deformation or molding and can be worked into optical blanks by hot blank pressing or injection molding, which blanks require no after treatment such as grinding or polishing. Masses which can be molded by hot blank pressing or injection molding and which have such high inorganic and additionally organic cross linkings have been hitherto totally unknown. Also new is the method of their production in which polycondensation, polyaddition and polymerization are or may be applied to one single product in the sense of tailoring in respect to both optical and mechanical properties. This goes far beyond the hitherto known possibilities in plastics materials. It is this flexibility in properties which is an aspect of the technological progress of the invention.

The invention thus provides a fast, and therefore economical, method of making optical blanks, especially spectacle lenses, of high quality.

When required, appropriate absorbing substances such as UV-absorbers, pigments or photochromatic substances may be incorporated in the optical blanks according to this invention. Moreover, the blanks may be provided, where desired, with surface-annealing treatment or with special coatings, for example, filter coatings or anti-reflective coatings.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLES

Example 1

Two solutions were prepared: 12.4 ml titanium tetraethylate in 50 ml toluene/ethanol (vol. ratio 1:1) (solution I);8.7 g dihydroxydiphenylsilane in 50 ml toluene/ethanol (vol. ratio 1:1) (solution II).

Solution I is mixed with 6 drops of glacial acetic acid whereupon solution II is added at room temperature within 15 minutes while stirring vigorously. Stirring is then continued for a further 15 minutes at 50° C. and then the solvent evaporated in a water jet vacuum at 50° C. This leaves a colorless solid residue.

The residue is suspended in 50 ml acetone. The suspension is mixed at 50° C. with 8.7 ml 0.1N HCL (=two molecules $H_2O$ per hydrolizable alkoxygroup), this produces a colorless clear solution which is stirred for a further 30 minutes at 50° C. This solution is concentrated by evaporation in a water jet vacuum at 50° C. The residue is taken up, potentially once or twice, in acetone and further evaporated until pH $\geq 4$ is reached.

The colorless solid residue is heated for one hour in a water jet vacuum to 80° C. in order to expel last remnants of solvent and achieve the desired hardening state. The granular and glass-clear product is then pressed at 130° C. under application of a pressure of 20 kN/cm² into a solid, hard, transparent, clear and homogeneous solid body. The said body or blank has a refractive index $n_D = 1.69$ and an Abbe number $v_D = 24$.

Example 2

Two solutions are prepared: 15.5 ml zirconium tetrapropylate in 50 ml toluene/ethanol (vol.ratio 1:1) (solution I); 10.8 g dihydroxydiphenylsilane in 50 ml toluene/ethanol (vol.ratio 1:1 ) (solution II).

Synthesizing method analogous to example 1. For the hydrolysis, 7.2 ml 0.1N HCl are used. The granular, glass-clear product is pressed at 120° C. under a pressure of 20 kN/cm$^2$ into a massive, transparent, clear and homogeneous solid body. This solid body has a refractive index $n_D = 1.60$ and an Abbe number $v_D = 38$.

Example 3

Two solutions are prepared: 4.4 ml 3-glycidylpropyltrimethoxysilane and 12.4 ml zirconium tetrapropylate in 50 ml toluene/ethanol (vol.ratio 1:1) (solution I); 8.7 g dihydroxydiphenylsilane in 50 ml toluene/ethanol (vol.ratio 1:1) (solution II).

Synthesizing method analogous to example 1. For the hydrolysis, 8.7 ml 0.1 n HCl are used. The granular glass-clear product is pressed at 100° C. under a pressure of 15 kN/cm$^2$ into a massive, hard, transparent, clear and homogeneous solid body. The solid body has a refractive index $n_D = 1.60$ and an Abbe number $v_D = 34$.

Example 4

Two solutions are prepared: 0.8 ml 3-methacryloxypropyltrimethoxysilane and 8.3 ml titanium tetraethylate in 20 ml toluene/ethanol (vol.ratio 1:1) (solution I); 6.5 g dihydroxydiphenylsilane in 45 ml toluene/ethanol (vol.ratio 1:1) (solution II).

Solution I is mixed with 6 drops of glacial acetic acid whereupon at room temperature solution II is added within 15–30 minutes stirring vigorously all the time. Stirring is continued for another 15 minutes at 50° C. and then the solvent evaporated in a water jet vacuum at 50° C. A colorless solid residue is left behind.

The residue is suspended in 25 ml acetone. The suspension is mixed at 50° C. with a mixture of 6.1 ml 0.1N HCl (=two molecules H$_2$O per hydrolyzable alkoxy group) and 3.0 ml acetone. This produces a colorless clear solution which is stirred further for 30 minutes at 50° C. The solution is then mixed with 2.9 ml methyl(meth)acrylate and 0.09 g dicyclohexylperoxodicarbonate and stirred for a further 60 minutes at 50° C. This solution is concentrated by evaporation in a water jet vacuum at 60° C. The residue, where applicable, is taken up once or twice with acetone and further evaporated until pH $\geq 4$ is achieved.

The slightly yellowish solid residue is heated for one hour in a water jet vacuum to 80° C. in order to expel the residual solvent. The granular and glass-clear product is pressed at 130° C. under 20 kN/cm$^2$ pressure to make a massive, hard, transparent, clear and homogeneous solid body.

Example 5

Two solutions are prepared: 0.7 ml 3-methacryloxypropyltrimethoxysilane and 12.4 ml zirconium tetrapropylate in 20 ml toluene/ethanol (vol.ratio 1:1) (solution I); 8.7 g dihydroxydiphenylsilane in 45 ml toluene/ethanol (vol.ratio 1:1) (solution II).

Synthesizing method analogous to example 4. 6.0 ml 0.1N HCl are used for the hydrolysis. The condensate is crosslinked with 1.9 ml methyl(meth)acrylate and 0.06 g dicyclohexylperoxodicarbonate. The granular, glass-clear product is pressed at 130° C. under 20 kN/cm$^2$ pressure into a massive hard, transparent, clear and homogeneous solid body. The solid body has a refractive index $n_d = 1.62$ and an Abbe number $v_D = 31$.

Example 6

16.2 g granular, glass-clear product from example 3 is homogeneously mixed by stirring with 14.2 g glycidyl(meth)acrylate. The mixture is heated for 15 minutes to 60° C. This produces a transparent, clear composition which is pressed at 150° C. under 10 kN/cm$^2$ pressure into a transparent, clear, homogeneous, massive and hard solid body. The solid body has a refractive index $n_D = 1.57$ and an Abbe number $v_D = 38$.

Example 7

16.1 g granular, glass-clear product from example 2 is homogeneously mixed by stirring with 5.5 ml 3-glycidylpropyltrimethoxysilane and 8.2 ml glycidyl(meth)acrylate. The mixture is heated for 15 minutes to 60° C. and then within a further 15 minutes from 60° to 80° C. This produces a transparent, clear composition which is pressed at 150° C. under 20 kN/cm$^2$ pressure into a transparent, clear, homogeneous, massive and hard solid body. The solid body has a refractive index $n_D = 1.57$ and an Abbe number $v_D = 38$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of producing an essentially nonswelling optical blank from a granulate or powder of polyorganoheterosiloxane, comprising subjecting said polyorganoheterosiloxane to hot-blank pressing to form said optical blank wherein during said hotblank processing step, the polymer is further polymerized and the resultant optical blank is essentially non-swelling in water and does not require a grinding step, said polyorganoheterosiloxane having been produced in a solvent reaction medium by hydrolytic preliminary condensation of (a) at least one compound, soluble in the reaction medium, of formula I $$MR_4 \qquad (I)$$

in which M represents titanium, zirconium or tin and R represents halogen, carbonate, hydroxy, alkoxy, acyloxy or a chelate liquid; and (b) at least one organofunctional silane of formula II $$R'_m(R''Y)_n SiX_{(4-m-n)} \qquad (II)$$

in which R' is a radical representing alkyl, alkenyl, aryl, arylalkyl, alkylaryl, arylalkenyl or alkenylaryl, R" represents alkylene, arylene, alkylenearylene, arylenealkylene or alkenylenearylene, and wherein said radical is optionally substituted by oxygen or sulphur atoms or by —NH-groups, X represents hydrogen, halogen, hydroxy, alkoxy, acyloxy or the group —NR'''$_2$ wherein R''' represents hydrogen and/or alkyl, Y represents methacryloxy-, epoxy- or vinyl-group, with m and n having the value 0, 1, 2 or 3 and m+n having the value 1, 2, or 3;

without addition of water or with the addition of a quantity of water which is less than the stoichiometric quantity required for the complete hydrolysis of the existing hydrolyzable groups, and subsequent further condensation by addition of at least the quantity of water which is needed for the hydrolysis of the remaining hydrolyzable groups, in which process, related to the total molar number of the initial components, 20–80 molar % of component (a), 80∝20 molar % of component (b) and 0–50 molar % of component (c) are employed; and removing said solvent to form said granulate or powder.

2. A method according to claim 1 comprising the hot blank pressing process conducted at temperatures from 20°–200° C. and pressures up to 100 kN/cm².

3. A method according to claim 1 comprising the hot blank pressing process applied at temperatures from 80°–150° C. and pressures from 5–50 kN/cm².

4. A method according to claim 1 wherein the polyorganoheterosiloxane is obtained by polymerization of a polyorganoheterosiloxane which comprises at least one polymerizable organic radical with
   (i) a condensate which comprises at least one copolymerizable organic radical, or
   (ii) a copolymerizable organic monomer, oligomer or polymer optionally in the presence of a polymerization-catalyst.

5. A method according to claim 2 wherein the polyorganoheterosiloxane is obtained by polymerization of a polyorganoheterosiloxane which comprises at least one polymerizable organic radical with
   (i) a condensate which comprises at least one copolymerizable organic radical, or
   (ii) a copolymerizable organic monomer, oligomer or polymer optionally in the presence of a polymerization-catalyst.

6. A method according to claim 4 wherein the copolymerizable monomer is (meth)acrylic acid or its salts, (meth)acrylic acid esters, (meth)acrylic acid amides, allyl compounds, vinyl compounds, epoxides and/or isocyanates, and the copolymerizable oligomer and polymer is derived from these monomers.

7. A method according to claim 5 wherein the copolymerizable monomer is (meth)acrylic acid or its salts, (meth)acrylic acid esters, (meth)acrylic acid amides, allyl compounds, vinyl compounds, epoxides and/or isocyanates, and the copolymerizable oligomer and polymer is derived from these monomers.

8. A method according to claim 4, characterized in that the polymerization occurs before or during the hot blank pressing process.

9. A method according to claim 5, characterized in that the polymerization occurs before or during the hot blank pressing process.

10. A method according to claim 1 wherein Y represents vinyl.

11. A method according to claim 1 wherein Y represents methacryloxy- or epoxy-.

12. A method according to claim 1 wherein the optical blank produced is of about 50–70 mm in diameter.

13. A method according to claim 1, further comprising:
   (c) a source of at least one oxide, soluble in the reaction medium and having low volatility, of an element of the main groups Ia to Va or of the secondary groups IIb or Vb in the periodic system, with the exception of titanium, zirconium and tin.

14. A method according to claim 13 comprising an oxide of a group IIb element.

* * * * *

UNITED STATES PATENT AND TRADEMARK OFFICE
CERTIFICATE OF CORRECTION

PATENT NO. : 4,715,999

DATED : December 29, 1987

INVENTOR(S) : Helmut DISLICH ET AL.

It is certified that error appears in the above-identified patent and that said Letters Patent is hereby corrected as shown below:

Claim 1, Column 11, line 12: Please cancel and replace by
-- nent (a) and 80-20 molar % of component (b) --; and Column 11, line 13: Cancel "0-50 molar % of component (c)".

Signed and Sealed this

Fourth Day of September, 1990

Attest:

HARRY F. MANBECK, JR.

*Attesting Officer*  *Commissioner of Patents and Trademarks*